United States Patent
Sauter et al.

(10) Patent No.: US 6,866,349 B2
(45) Date of Patent: Mar. 15, 2005

(54) TRACTION CONTROL SYSTEM INCLUDING INDIVIDUAL SLIP THRESHOLD REDUCTION OF THE DRIVE WHEEL ON THE OUTSIDE OF THE CURVE

(75) Inventors: Thomas Sauter, Remseck (DE); Helmut Wandel, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/396,191

(22) Filed: Mar. 24, 2003

(65) Prior Publication Data

US 2003/0214182 A1 Nov. 20, 2003

(30) Foreign Application Priority Data

Mar. 27, 2002 (DE) .......................... 102 13 663
Aug. 21, 2002 (DE) .......................... 102 38 221

(51) Int. Cl.$^7$ .............................................. B60T 8/32
(52) U.S. Cl. ...................... 303/140; 303/148; 303/149; 303/189
(58) Field of Search ................................ 303/140, 139, 303/189, 146, 147, 148, 149

(56) References Cited

U.S. PATENT DOCUMENTS

| | | | |
|---|---|---|---|
| 5,305,218 A | | 4/1994 | Ghoneim |
| 5,407,023 A | | 4/1995 | Yamashita et al. |
| 5,694,321 A | * | 12/1997 | Eckert et al. ............... 303/140 |
| 6,289,281 B1 | * | 9/2001 | Shinmura et al. ........... 701/301 |
| 6,481,806 B1 | * | 11/2002 | Krueger et al. ............. 303/140 |

\* cited by examiner

*Primary Examiner*—Matthew C. Graham
(74) *Attorney, Agent, or Firm*—Kenyon & Kenyon

(57) ABSTRACT

A vehicle traction control system having capabilities for braking intervention and coefficient of friction detection is provided, a slipping wheel being braked by braking intervention if a slip threshold is exceeded. In order to improve the lateral stability of the vehicle when cornering on road surfaces having a low coefficient of friction, the slip threshold for the drive wheel on the outside of the curve is reduced independently of that of the drive wheel on the inside of the curve and is set to a lower value than that for the wheel on the inside of the curve.

18 Claims, 1 Drawing Sheet

TRACTION CONTROL SYSTEM INCLUDING INDIVIDUAL SLIP THRESHOLD REDUCTION OF THE DRIVE WHEEL ON THE OUTSIDE OF THE CURVE

FIELD OF THE INVENTION

The present invention relates to a traction control system (TCS) including braking intervention, as well as a corresponding method for traction control.

BACKGROUND INFORMATION

The primary task of a TCS is to ensure the stability and steerability of the vehicle when starting off and accelerating, as well as to assist the driver when driving on a slippery road surface. To this end, the slipping wheels are braked by a braking intervention if a slip threshold is exceeded, and the engine torque is adapted to the particular drive torque that can be transferred to the road.

It is known to reduce the slip thresholds for the drive wheels on the inside and outside of a curve when cornering on a road surface having a low adhesive friction value in order to adequately preserve lateral stability. However, in order for adequate propulsion to be generated in less critical curves as well, the reduction of the slip thresholds is limited.

The consequence of setting slip thresholds in this manner is that due to the relatively high allowable slip on the drive wheel on the outside of the curve in particular, the maximum possible lateral stability is not achieved, and the vehicle stability cannot be adequately improved.

Due to dynamic wheel load transfer (the wheel on the inside of the curve is relieved of load and the wheel on the outside of the curve is dynamically loaded when cornering), the drive wheel on the inside of the curve generally starts to slip first even with low lateral acceleration, and the braking intervention not only brings about the elimination of slip on the wheel on the inside of the curve but also transfers a specific torque (blocking torque) to the wheel on the outside of the curve. The effect of this blocking torque is that the slip on the wheel on the outside of the curve is once more increased "subtly" (i.e., with low dynamics), and thus the lateral stability is additionally reduced. The wheel on the outside of the curve thus continues to be underbraked and slips for a disproportionately long time, and therefore achieves only a fraction of the maximum possible lateral stability.

SUMMARY OF THE INVENTION

The object of the present invention is to provide a traction control system as well as a corresponding method which makes it possible to improve the vehicle stability when cornering on a road surface having a low coefficient of friction.

This object is achieved according to the present invention by providing a traction control system including braking intervention in such a way that when cornering on a road surface having a low coefficient of friction, the slip threshold for the wheel on the outside of the curve is reduced independently of that of the wheel on the inside of the curve and is set to a lower value than that of the wheel on the inside of the curve. Consequently, the TCS regulation is already initiated at a very low wheel slip and is thus better able to maintain the lateral stability of the vehicle. In addition, due to the higher slip threshold of the drive wheel on the inside of the curve, less blocking torque is transferred to the wheel on the outside of the curve.

It is also not absolutely necessary to lower the slip threshold for the wheel on the inside of the curve, but instead it may also be increased, if necessary, in order to thus reduce the blocking torque transferred to the wheel on the outside of the curve.

In order to detect if the vehicle is cornering on a road surface having a low coefficient of friction, the TCS has arrangements for detecting curves and coefficients of friction. Cornering is detected, for example, using the difference of the speeds of the non-driven wheels. The coefficient of friction may be detected, for example, using a lateral acceleration sensor. The lateral acceleration occurring is an indication of the adhesive friction value of the road surface. A low adhesive friction value (e.g., less than 0.35) may be ruled out, for example, if the lateral acceleration is higher than approximately 5.5 m/s$^2$. It is also possible to determine the prevailing adhesive friction value qualitatively based on the slip occurring on the pair of wheels on the outside of the curve, in particular if the lateral acceleration is low.

According to an embodiment of the present invention, the slip threshold of the drive wheel on the outside of the curve is reduced as a function of the determined adhesive friction value, the slip threshold being set lower as the adhesive friction diminishes.

It is also possible to reduce the slip threshold of the drive wheel on the outside of the curve as a function of the vehicle speed, the slip threshold being set lower as the vehicle speed increases.

It is also possible to change the slip threshold of the drive wheel on the outside of the curve as a function of the radius of the curve and the vehicle speed.

In addition to the individual adaptation of the slip thresholds, it is also possible to set the pressure buildup gradient for the braking pressure of the drive wheel on the outside of the curve to a higher value independently of the wheel on the inside of the curve. The drive wheel on the outside of the curve is thus strongly braked in the initial phase of the TCS regulation and develops only minimal slip.

It is possible to change the pressure buildup gradient as a function of the determined adhesive friction value and/or the vehicle speed, the pressure buildup gradient being increased as the adhesive friction decreases and vehicle speed increases.

The slip thresholds and/or the pressure buildup gradient may be changed using characteristic curves or tables stored in the system, or according to a calculation.

According to another embodiment of the invention, immediately after the detection of cornering at a low coefficient of friction, e.g., even before the drive wheel on the outside of the curve has exceeded the slip threshold, an increased brake pressure is fed to the brake on the outside of the curve, which causes the brake linings to be in immediate contact with the brake disc, thus making it possible to build up the brake pressure spontaneously if necessary. This is done using a fill pulse at a pressure between 3 and 10 bar, e.g., between 4 and 8 bar.

According to yet another embodiment of the invention, the pressure reduction gradient at the brake of the drive wheel on the outside of the curve is reduced relative to the wheel on the inside of the curve. The pair of wheels on the outside of the curve thus makes the entire cornering possible with minimum slip, and thus provides maximum lateral stability.

The operating mode "low coefficient of friction curve," i.e., the setting of individual slip thresholds, may be maintained until either straight-ahead driving or cornering at a high coefficient of friction has been determined. The high coefficient of friction may, for example, be recognized by high lateral accelerations of the vehicle.

In the operating mode "low coefficient of friction curve," the slip threshold for the drive wheel on the outside of the curve is set, e.g., to values between 1.5 km/h and 2 km/h in vehicles with front-wheel drive and to 1 km/h to 1.5 km/h in vehicles with rear-wheel drive.

DETAILED DESCRIPTION

Figure 1:
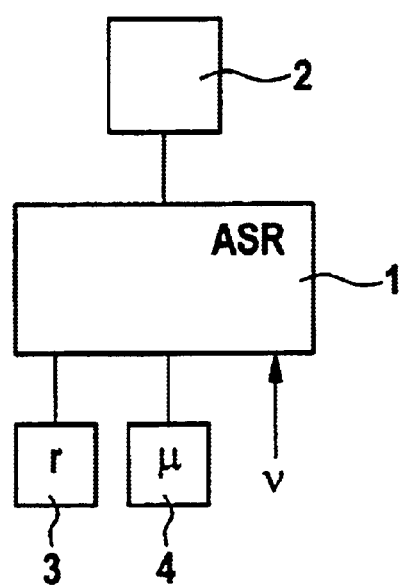
FIG. 1 shows a schematic representation of a TCS.

FIG. 1 shows a TCS having a central regulating unit 1, a device 3 for detecting cornering and a device 4 for detecting coefficient of friction.

In this case, cornering is detected by analyzing the difference between the speeds of the non-driven wheels. The coefficient of friction may be detected, for example, by using a lateral acceleration sensor.

To determine the wheel slip, speed v of the driven wheels is also supplied to regulating unit 1. If one of the drive wheels exceeds the slip threshold, the slipping drive wheel is braked using wheel brake 2.

The TCS is set up in such a way that when cornering on a road surface having a low coefficient of friction, the slip threshold for the drive wheel on the outside of the curve is reduced independently of that of the wheel on the inside of the curve and is set to a lower value than that of the wheel on the inside of the curve. For example, the slip threshold of the wheel on the outside of the curve is set to be more sensitive as the adhesive friction value of the road surface is reduced.

Figure 2:
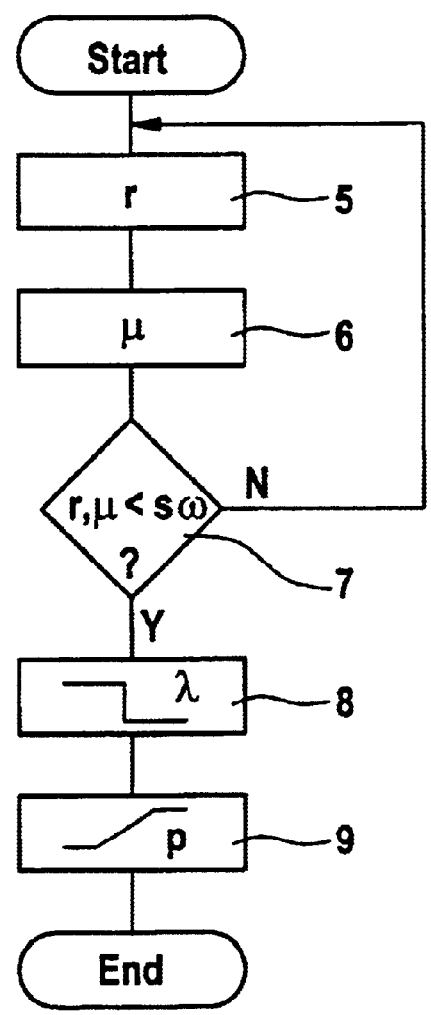
FIG. 2 shows a flow chart of a method for traction control regulation according to one embodiment of the present invention.

FIG. 2 shows in the form of a flow chart the method sequence of a traction control operation according to the present invention.

In a first step 5, it is first determined if the vehicle is cornering, and the coefficient of friction of the road surface is determined in step 6.

If it is determined in step 7 that the vehicle is cornering on a road surface having a low coefficient of friction, the slip threshold of the wheel on the outside of the curve is reduced in step 8 to a value lower than the slip threshold for the wheel on the inside of the curve. If a drive wheel exceeds its individually specified slip threshold, it is braked by the TCS regulating unit using wheel brake 2. The pressure buildup gradient for the brake pressure on the brake of the wheel on the outside of the curve in step 9 is increased more strongly than for the wheel on the inside of the curve.

In this manner, it is thus possible to substantially improve the stability of a vehicle when cornering on a road surface having a low coefficient of friction.

What is claimed is:

1. A traction control system for a vehicle, comprising:
   a braking intervention arrangement for providing braking of a slipping drive wheel if a slip threshold for the slipping drive wheel is exceeded; and
   an arrangement for adjusting slip thresholds for drive wheels of the vehicle;
   wherein when the vehicle is cornering a curve on a road surface having a low coefficient of friction, a slip threshold for a drive wheel on the outside of the curve is independently reduced relative to a slip threshold for a drive wheel on the inside of the curve, and
   wherein a pressure build-up gradient for a brake pressure of the drive wheel on the outside of the curve is increased more rapidly than a pressure build-up gradient for a brake pressure of the drive wheel on the inside of the curve.

2. The traction control system as recited in claim 1, wherein the slip threshold for the drive wheel on the outside of the curve is reduced as a function of an adhesive friction value of the road surface.

3. The traction control system as recited in claim 1, wherein the slip threshold for the drive wheel on the outside of the curve is reduced as a function of the vehicle speed.

4. The traction control system as recited in claim 1, wherein the slip threshold for the drive wheel on the outside of the curve is reduced as a function of a radius of the curve.

5. The traction control system as recited in claim 1, wherein the slip threshold for the drive wheel on the outside of the curve is set to a lower value than the slip threshold for the drive wheel on the inside of the curve.

6. The traction control system as recited in claim 1, wherein the pressure build-up gradient for the drive wheel on the outside of the curve is increased as a function of one of an adhesive friction value and the vehicle speed.

7. The traction control system as recited in claim 1, wherein an increased brake pressure is applied to a brake of the drive wheel on the outside of the curve before the drive wheel on the outside of the curve has exceeded the slip threshold for the drive wheel on the outside of the curve.

8. The traction control system as recited in claim 7, wherein a brake pressure between 3 and 9 bar is applied to the brake of the drive wheel on the outside of the curve.

9. The traction control system as recited in claim 1, wherein a pressure reduction gradient for a brake of the drive wheel on the outside of the curve is reduced in comparison to a pressure reduction gradient for a brake of the drive wheel on the inside of the curve.

10. A method for traction control of a vehicle, comprising:
    braking a slipping drive wheel by a braking intervention arrangement if a slip threshold for the slipping drive wheel is exceeded;
    determining whether the vehicle is cornering a curve on a road surface;
    determining a coefficient of friction of the road surface; and
    independently reducing a slip threshold for a drive wheel on the outside of the curve to a lower value relative to a slip threshold for a drive wheel on the inside of the curve if it is determined that the vehicle is cornering a curve on a road surface having a low coefficient of friction;
    wherein a pressure build-up gradient for a brake pressure of the drive wheel on the outside of the curve is increased more rapidly than a pressure build-up gradient for a brake pressure of the drive wheel on the inside of the curve.

11. The method as recited in claim 10, wherein the slip threshold for the drive wheel on the outside of the curve is reduced as a function of an adhesive friction value.

12. The method as recited in claim 10, wherein the slip threshold for the drive wheel on the outside of the curve is set to a lower value than the slip threshold for the drive wheel on the inside of the curve.

13. The method as recited in claim 10, wherein the slip threshold for the drive wheel on the outside of the curve is reduced as a function of the vehicle speed.

14. The method as recited in claim 10, wherein the slip threshold for the drive wheel on the outside of the curve is reduced as a function of a radius of the curve.

15. The method as recited in claim 10, wherein the pressure build-up gradient for the drive wheel on the outside of the curve is increased as a function of one of an adhesive friction value and the vehicle speed.

16. The method as recited in claim 10, wherein an increased brake pressure is applied to a brake of the drive wheel on the outside of the curve before the drive wheel on the outside of the curve has exceeded the slip threshold for the drive wheel on the outside of the curve.

17. The method as recited in claim 16, wherein a brake pressure between 3 and 9 bar is applied to the brake of the drive wheel on the outside of the curve.

18. The method as recited in claim 10, wherein a pressure reduction gradient for a brake of the drive wheel on the outside of the curve is reduced in comparison to a pressure reduction gradient for a brake of the drive wheel on the inside of the curve.

* * * * *